United States Patent
Takahashi

(10) Patent No.: US 8,523,366 B2
(45) Date of Patent: Sep. 3, 2013

(54) PROJECTOR HAVING PROJECTION CONDITION CONTROL UNIT THAT PERFORMS PROJECTION CONDITION CONTROL BASED ON PROJECTED TEST IMAGE

(75) Inventor: Tadao Takahashi, Oita (JP)

(73) Assignee: Seiko Epson Corporation, Tokyo (JP)

( * ) Notice: Subject to any disclaimer, the term of this patent is extended or adjusted under 35 U.S.C. 154(b) by 684 days.

(21) Appl. No.: 12/644,141

(22) Filed: Dec. 22, 2009

(65) Prior Publication Data

US 2010/0165168 A1   Jul. 1, 2010

(30) Foreign Application Priority Data

Dec. 26, 2008   (JP) ................................. 2008-332973

(51) Int. Cl.
| G03B 21/00 | (2006.01) |
| G03B 21/14 | (2006.01) |
| H04N 3/22  | (2006.01) |
| H04N 3/26  | (2006.01) |
| H04N 17/00 | (2006.01) |
| H04N 17/02 | (2006.01) |

(52) U.S. Cl.
USPC ............................. 353/69; 348/177; 348/745

(58) Field of Classification Search
USPC ..................... 353/69–70, 122; 348/177–178, 348/333.1, 745–747; 396/429
See application file for complete search history.

(56) References Cited

U.S. PATENT DOCUMENTS

| 6,412,956 | B2 * | 7/2002 | Fujita et al. .................... 353/122 |
| 6,846,081 | B2 * | 1/2005 | Mochizuki et al. .............. 353/70 |
| 7,167,645 | B2 * | 1/2007 | Matsuda et al. ............... 396/213 |
| 7,226,173 | B2 * | 6/2007 | Aoyanagi ..................... 353/101 |
| 7,347,564 | B2   | 3/2008 | Matsumoto et al. |
| 7,396,133 | B2 * | 7/2008 | Burnett et al. .................. 353/69 |
| 8,011,789 | B2 * | 9/2011 | Murata .......................... 353/69 |
| 2003/0210381 | A1 * | 11/2003 | Itaki ............................... 353/70 |
| 2006/0152682 | A1 * | 7/2006 | Matsuda et al. ................ 353/40 |
| 2008/0204670 | A1 * | 8/2008 | Furui .............................. 353/69 |
| 2009/0091623 | A1 * | 4/2009 | Krogstad ...................... 348/189 |

FOREIGN PATENT DOCUMENTS

| JP | 2000-028901 A | 1/2000 |
| JP | 2000-241874 A | 9/2000 |
| JP | 2006-060447 A | 3/2006 |
| JP | 2006-165949 A | 6/2006 |

* cited by examiner

Primary Examiner — Tony Ko
Assistant Examiner — Jori S Reilly-Diakun
(74) Attorney, Agent, or Firm — ALG Intellectual Property, LLC

(57) ABSTRACT

A projector includes: an image projection unit which projects an image corresponding to image information; an image pickup unit which shoots the image projected from the image projection unit; an image switching unit which switches state of the image based on a predetermined phenomenon; and a projection condition control unit which allows the image projection unit to project a predetermined test image at the time when the image switching unit switches state of the image, and allows the image pickup unit to shoot the projected test image to control projection condition of the image based on the picked-up image result.

13 Claims, 7 Drawing Sheets

SCREEN

PICKED-UP IMAGE

PIXEL AREA

SCREEN

PIXEL AREA

SCREEN

PROJECTOR HAVING PROJECTION CONDITION CONTROL UNIT THAT PERFORMS PROJECTION CONDITION CONTROL BASED ON PROJECTED TEST IMAGE

The entire disclosure of Japanese Patent Application No. 2008-332973 filed Dec. 26, 2008 is expressly incorporated by reference herein.

BACKGROUND

1. Technical Field

The present invention relates to a projector which projects images.

2. Related Art

Recently, a projector for image projection which has function of detecting installation condition of the projector or the like and automatically controlling projection condition such as focus control and trapezoidal distortion correction (automatic control function) has been proposed. For automatically controlling projection condition, a distance measuring sensor for measuring the distance to a projection surface (screen), a gravity sensor for detecting inclination of the projector in the up-down direction, and other components are provided to perform control according to detection results from the sensors, for example. Also, a predetermined test image (detection pattern) is projected and shot by an image pickup unit, and the projection condition is controlled according to the result of the shot image in another example (see JP-A-2000-241874 and JP-A-2006-60447, for example).

According to the example which controls the projection condition by using the test image as in the projector disclosed in JP-A-2006-60447, trapezoidal distortion caused by inclination not only in the up-down direction but also in the left-right direction can be corrected. Moreover, zoom control for allowing projection of images within a detected range to which images are to be projected (screen frame) can be automatically performed. Thus, usability of the projector for a user improves. According to this example, the test image is projected at the time of control. In this case, the control is automatically executed while the user is observing images, which makes the user uncomfortable. For avoiding this situation, in the structure controlling the projection condition by using the test image, the projection condition is automatically carried out only when the startup of the projector (immediately after turning on the power source) or when a definite request (operation) is given from the user.

However, some users do not know how to start the automatic control function, or do not even know that the projector has the automatic control function. When these users change the installation condition of the projector after startup, they manually control the projection condition or observe images without appropriate control. In this case, the automatic control function is not effectively utilized.

SUMMARY

It is an advantage of some aspects of the invention to provide a projector capable of solving at least a part of the problems described above.

A projector according to an aspect of the invention includes: an image projection unit which projects an image corresponding to image information; an image pickup unit which shoots the image projected from the image projection unit; an image switching unit which switches state of the image based on a predetermined phenomenon; and a projection condition control unit which allows the image projection unit to project a predetermined test image at the time when the image switching unit switches state of the image, and allows the image pickup unit to shoot the projected test image to control projection condition of the image based on the picked-up image result.

According to this projector, the projection condition control unit controls the projection condition at the time when state of the image is switched. Thus, the projection condition can be appropriately controlled without requiring operation input only for controlling the projection condition. Moreover, the test image for controlling the projection condition is projected at the time when state of the image is switched. Thus, the user does not feel considerably uncomfortable when the test image is projected.

In the projector according to this aspect, it is preferable that the projector further includes: a plurality of image information input units to which the image information is inputted; and an operation input unit which receives operation input. The image switching unit switches the image projected from the image projection unit by selecting one of the plural image information input units based on the operation input received by the operation input unit. The projection condition control unit controls the projection condition at the time when the image switching unit selects the image information input unit.

In the projector according to this aspect, it is preferable that the projector further includes an operation input unit which receives operation input. The image switching unit switches between normal projection condition for projecting the image from the image projection unit and image mute condition for temporarily stopping projection of the image based on the operation input received by the operation input unit. The projection condition control unit controls the projection condition at the time when the image switching unit switches between the normal projection condition and the image mute condition.

In the projector according to this aspect, it is preferable that the projector further includes an image information input unit to which the image information is inputted. The image switching unit switches state of the image based on change of the image information inputted to the image information input unit. The projection condition control unit controls the projection condition at the time when the image switching unit switches state of the image.

In the projector according to this aspect, it is preferable that the predetermined test image is divided into bright areas and dark areas. It makes easy to detect the edge contained in the imaged test image because the bright areas and the dark areas produce the high contrast.

In the projector according to this aspect, it is preferable that the bright areas are white and the dark areas are black. According to this configuration, the contrast between the white areas and the black areas appears clearly.

In the projector according to this aspect, it is preferable that the predetermined test image is a striped image. According to this configuration, the test image contains bright stripes and dark stripes. Therefore, it is easy to detect the edge included in the imaged test image.

In the projector according to this aspect, it is preferable that the predetermined test image is an checkered image. According to this configuration, the test image contains bright blocks and dark blocks. Therefore, it is easy to detect the edges included in the imaged test image.

In the projector according to this aspect, it is preferable that the predetermined test image is an white rectangle with a black fringe. According to this configuration, the test image contains bright rectangle and dark fringe. Therefore, it is easy to detect the edges included in the imaged test image.

BRIEF DESCRIPTION OF THE DRAWINGS

The invention will be described with reference to the accompanying drawings, wherein like numbers reference like elements.

FIGS. 5A through 5F illustrate an example of zoom control and trapezoidal distortion correction, in which: FIGS. 5A, 5D and 5F show a screen; FIG. 5B shows a picked-up image of a screen; and FIGS. 5C and 5E show a pixel area of a liquid crystal light valve.

DESCRIPTION OF EXEMPLARY EMBODIMENT

A projector according to an embodiment of the invention is hereinafter described with reference to the drawings.

A projector is an optical apparatus which modulates light emitted from a light source to form an image corresponding to image information inputted from the outside (hereinafter referred to as "input image"), and projects the image on a surface such as a screen and a white board (hereinafter referred to as "screen" as well). The projector in this embodiment has a projection condition control function for controlling the projection condition of the image such that the projection condition becomes appropriate for the installation condition of the projector. This control function includes control (correction) of trapezoidal distortion produced when the image is projected diagonally with respect to the screen as well as focus condition and zoom condition controls.

Figure 1:
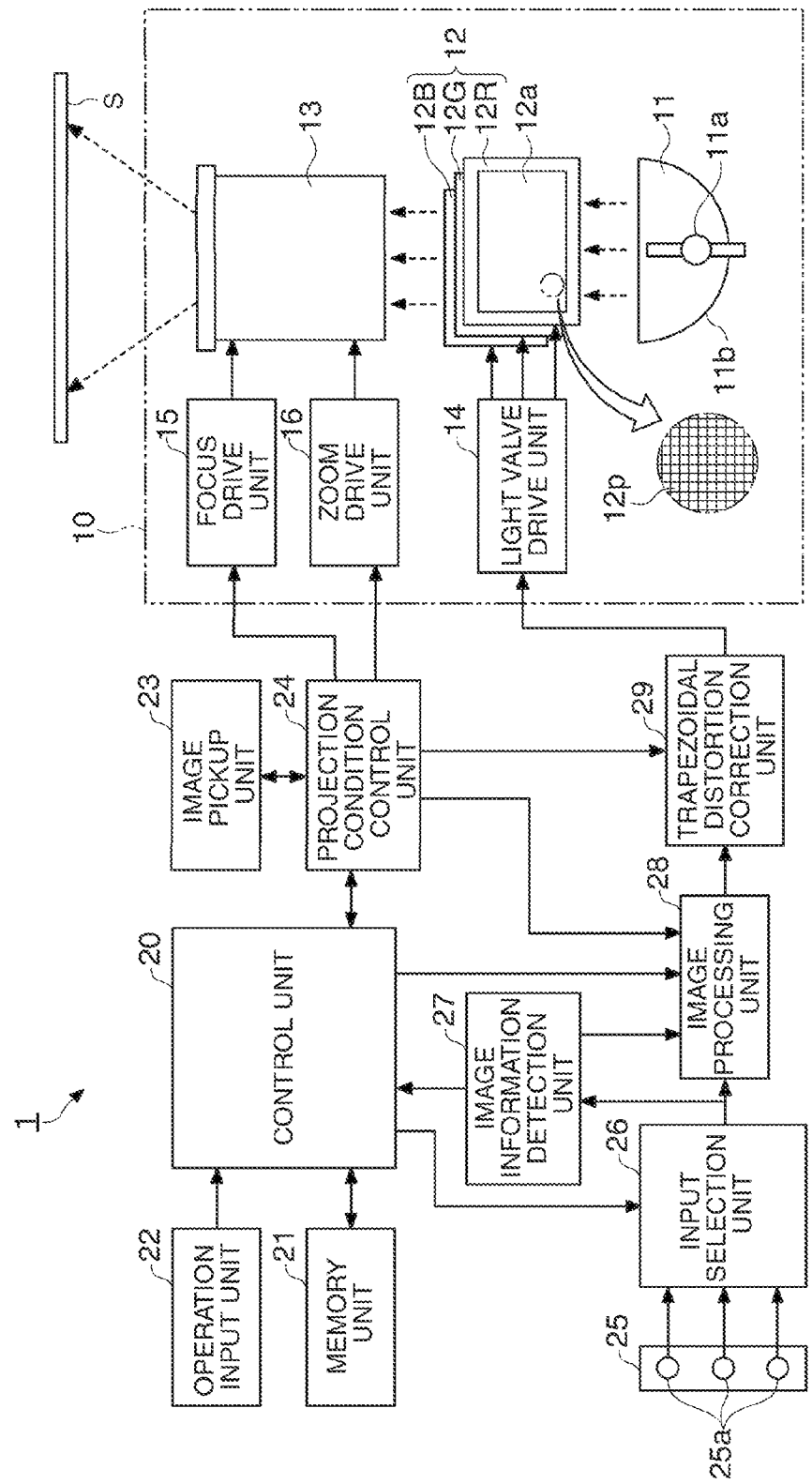
FIG. 1 is a block diagram showing a general structure of a projector.

FIG. 1 is a block diagram showing the general structure of the projector.

As shown in FIG. 1, a projector 1 includes an image projection unit 10, a control unit 20, a memory unit 21, an operation input unit 22, an image pickup unit 23, a projection condition control unit 24, a set of input terminals 25, an input selection unit 26, an image information detection unit 27, an image processing unit 28, a trapezoidal distortion correction unit 29, and other parts.

The image projection unit 10 has a light source 11, three liquid crystal light valves 12 (12R, 12G, and 12B) as light modulation devices, a projection lens 13 as projection system, a light valve drive unit 14, a focus drive unit 15, a zoom drive unit 16, and other components. The image projection unit 10 corresponds to a display unit which forms an image (image light) by modulating light emitted from the light source 11 by the function of the liquid crystal light valves 12 and expands and projects the image through the projection lens 13 to display the image on an external screen S.

The light source 11 has a discharge-type light source lamp 11a constituted by an extra-high pressure mercury lamp, a metal halide lamp or the like, and a reflector 11b which reflects light emitted from the light source lamp 11a substantially in a fixed direction. Light emitted from the light source 11 is converted into light having substantially uniform luminance distribution by a not-shown integrator system, and is divided into light components in three primary colors of red (R), green (G), and blue (B) by a not-shown color division system. Then, the respective color components enter the corresponding liquid crystal light valves 12R, 12G, and 12B.

Each of the liquid crystal light valves 12 is constituted by a liquid crystal panel having a pair of transparent substrates between which liquid crystals are sealed, for example. Each of the liquid crystal light valves 12 has a rectangular pixel area 12a on which plural pixels 12p are arranged in matrix, and driving voltage can be applied to each of the pixels 12p of the liquid crystals. When driving voltage corresponding to inputted image information is applied to the respective pixels 12p by the light valve drive unit 14, light transmissivity corresponding to the image information is set for the respective pixels 12p. Thus, light emitted from the light source 11 is modulated while passing through the pixel areas 12a of the liquid crystal light valves 12, and images corresponding to the image information are formed for respective color lights.

The images in respective colors are combined for each pixel 12p by a not-shown color combining system to form a color image. This color image is expanded and projected to the screen S through the projection lens 13 as a unit of plural lenses.

The projection lens 13 has a focus mechanism (not shown) driven by the focus drive unit 15, and a zoom mechanism (not shown) driven by the zoom drive unit 16. The focus drive unit 15 and the zoom drive unit 16 operate the focus mechanism and the zoom mechanism, respectively, based on a request from the projection condition control unit 24, thereby varying positional relationship between the respective lenses in the optical axis direction and focus condition control (focus control) and zoom condition control (zoom control) are carried out.

In this specification, the entire image projected from the projection lens 13 is referred to as "projection image". The projection image corresponds to projection of an image formed on the entire area of the pixel area 12a. Thus, when the entire or a part of the pixel area 12a is black (area through which most light does not pass), the projection image includes the area corresponding to the black part. Also, when a part of the image projected toward the screen S protrudes from the screen S and is projected on a wall surface behind or the like, the projection image includes the protruding part. In zoom control, the size of the projection image increases or decreases with respect to a position corresponding to a predetermined zoom reference (center of the pixel area 12a in this embodiment) on the pixel area 12a.

The control unit 20 includes a CPU (central processing unit), a RAM (random access memory) for temporarily storing various data and the like, and others (any not shown). The control unit 20 operates according to a control program stored in the memory unit 21 to provide general control over the operation of the projector 1. Thus, the control unit 20 functions as a computer in cooperation with the memory unit 21.

The memory unit 21 has non-volatile memories such as mask ROM (read only memory), flash memory, and FeRAM (ferroelectric RAM). The memory unit 21 stores the control program for controlling the operation of the projector 1, various setting data for specifying operation conditions and the like of the projector 1, and others.

The operation input unit 22 receives input operation from a user, and has plural operation keys through which the user gives various commands to the projector 1. The operation keys provided on the operation input unit 22 include a "power source key" for switching between ON and OFF of the power source, an "input switching key" for switching an effective input terminal 25a, a "mute key" for switching between temporary stop and restart of image projection, "projection condition control key" for issuing projection condition control request, and other keys. In response to operation of the operation keys of the operation input unit 22 by the user, the operation input unit 22 detects the input operation and outputs an operation signal corresponding to the operation of the user to the control unit 20. The operation input unit 22 may be constituted by a remote controller (not shown) operable by remote control. In this case, the remote controller transmits an infrared light operation signal corresponding to the operation of the user, and a not-shown remote controller signal receiving unit receives the operation signal and transfers the operation signal to the control unit 20.

The image pickup unit 23 takes an image of the front of the projector 1 (image projection direction), and includes an image pickup element (not shown) of a CCD (charge coupled device) sensor, a CMOS (complementary metal oxide semiconductor) sensor or the like, and an image pickup lens (not shown) disposed before the image pickup element. The image pickup unit 23 shoots an image of an area including at least the projection image positioned before the image pickup unit 23 in response to a request from the projection condition control unit 24, and produces image data (hereinafter referred to as "picked-up image data") corresponding to the picked-up image result (picked-up image). The picked-up image data produced by the image pickup unit 23 is outputted to the projection condition control unit 24.

The projection condition control unit 24 performs process for controlling (correcting) image projection condition (focus condition, zoom condition, and image deformation condition due to trapezoidal distortion in this embodiment) in response to a request from the control unit 20. More specifically, the projection condition control unit 24 allows the image processing unit 28 to project a test image for projection condition control (such as a striped image and a monochrome and no-pattern image) from the image projection unit 10, and allows the image pickup unit 23 to shoot the projected test image. Then, the projection condition control unit 24 analyzes the picked-up image data (picked-up image), and controls the focus drive unit 15 and the zoom drive unit 16 such that the condition of the projected image becomes an appropriate projection condition. Also, the projection condition control unit 24 obtains correction information for correcting trapezoidal distortion and outputs the correction information to the trapezoidal distortion correction unit 29.

The set of input terminals 25 have plural input terminals 25a as image information input units to which image information outputted from an external image output device such as a video reproduction device and a personal computer is inputted via a not-shown cable. The image information inputted to the respective input terminals 25a is supplied to the input selection unit 26.

The input selection unit 26 selects one of the plural input terminals 25a according to a request from the control unit 20, and outputs the image information inputted to the selected input terminal 25a to the image processing unit 28. When the user requests switching of the input terminal 25a by operating the input switching key provided on the operation input unit 22, the control unit 20 allows the input selection unit 26 to select the next input terminal 25a. As a result, the input terminal 25a, that is, the image information to be outputted to the image processing unit 28 can be changed.

The image information detection unit 27 detects whether the image information has been inputted to the input terminal 25a selected by the input selection unit 26 (hereinafter referred to as "selected input terminal 25a" as well) based on the image information outputted from the input selection unit 26 to the image processing unit 28. Also, the image information detection unit 27 detects display mode of the inputted image information (such as resolution and scanning system), and notifies the control unit 20 and the image processing unit 28 about the detection result.

The image processing unit 28 samples the image information inputted from the input selection unit 26 (hereinafter referred to as "input image information" as well) based on the display mode detected by the image information detection unit 27, and converts the sampled image information into image information representing gradations of the respective pixels 12p of the liquid crystal light valves 12. The converted image information provided for each of the color lights R, G and B, is constituted by plural pixel values associated with all of the pixels 12p on the liquid crystal light valves 12R, 12G, and 12B. The pixel values determine light transmissivity of the corresponding pixels 12p to specify intensities (gradations) of lights released from the respective pixels 12p. The image processing unit 28 also performs image quality control process for controlling brightness, contrast, sharpness, hue, and other conditions, OSD process for superposing OSD (on screen display) images such as a menu image and a message image, and other processes for the converted image information in response to the request from the control unit 20, and outputs the processed image information to the trapezoidal distortion correction unit 29.

Moreover, the image processing unit 28 can output image information corresponding to the test image described above in response to a request from the projection condition control unit 24. When the projection condition control unit 24 allows the image processing unit 28 to project the test image, the image processing unit 28 produces image information corresponding to the request from the projection condition control unit 24 and outputs the produced image information to the trapezoidal distortion correction unit 29 regardless of the contents of the input image information. For example, when projection of white plain image (total white image) is requested as the test image, the image processing unit 28 produces image information specifying the maximum light transmissivity for all of the pixels 12p, and outputs the produced image information.

Furthermore, the image processing unit 28 can switch between normal projection condition in which input image is projected from the image projection unit 10 and image mute condition in which projection of input image is temporarily stopped based on a request from the control unit 20. When the mute key is operated by the user under the normal projection condition, the control unit 20 allows the image processing unit 28 to shift to the image mute condition. The image processing unit 28 having received this request produces image information corresponding to black plain image (total black image), that is, image information specifying the minimum light transmissivity for all of the pixels 12p regardless of the contents of the input image information, and outputs the produced image information to the trapezoidal distortion correction unit 29. When the mute key is operated by the user under the image mute condition, the control unit 20 allows the image processing unit 28 to return to the normal projection condition. The image processing unit 28 having received this request restarts output of the image information corresponding to the input image information. When the image information detection unit 27 detects that no image information has been inputted to the selected input terminal 25a, the image processing unit 28 similarly outputs image information of total black image to the image processing unit 28.

The trapezoidal distortion correction unit 29 prevents trapezoidal distortion by correcting image information in response to a request from the projection condition control unit 24. More specifically, the trapezoidal distortion correction unit 29 determines an image forming area in such a form as to cancel the trapezoidal distortion within the pixel areas 12a of the liquid crystal light valves 12 based on correction information inputted from the projection condition control unit 24. Then, the trapezoidal distortion correction unit 29 corrects the image information inputted from the image processing unit 28 such that an input image can be formed within the image forming area, and outputs the corrected image information to the light valve drive unit 14. When request for correcting the image information is not given from the projection condition control unit 24, the trapezoidal distortion correction unit 29 outputs the image information inputted from the image processing unit 28 to the light valve drive unit 14 as it is. In this case, the input image is formed on the entire area of the pixel area 12a.

When the light valve drive unit 14 operates the liquid crystal light valves 12 according to the image information inputted from the trapezoidal distortion correction unit 29, the liquid crystal light valves 12 form an image corresponding to the image information as the image to be projected through the projection lens 13.

The operation of the projector 1 is now described.

Figure 2:
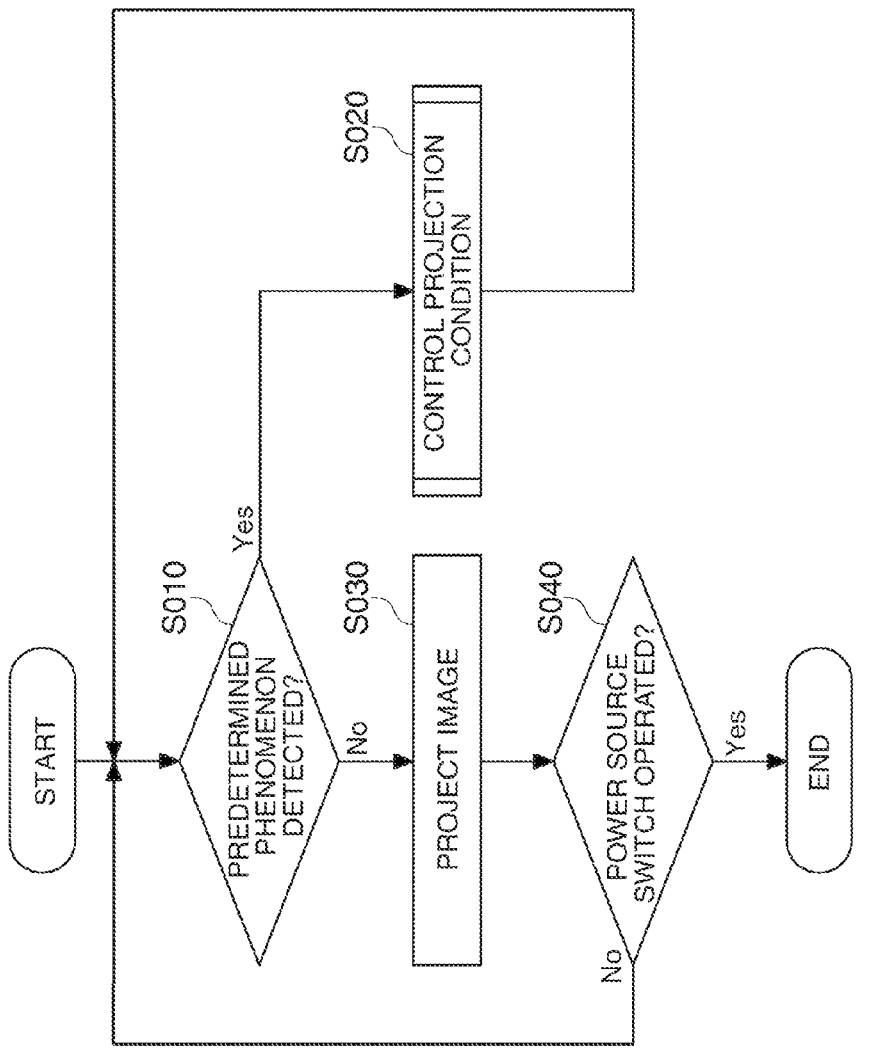
FIG. 2 is a flowchart showing control of the projector in the embodiment.

By supply of commercial power, the projector 1 comes into standby mode for startup. When detecting operation of the power source key, the projector 1 turns on the light source 11 to shift to the normal operation mode for allowing image projection. As a result, the projector 1 comes to condition where image projection is allowed. As shown in FIG. 2, the projector 1 detects this transition of condition as a predetermined phenomenon (step S010), and starts control of projection condition described later (step S020). More specifically, the control unit 20 allows the projection condition control unit 24 to perform projection condition control prior to input image projection. When the projection condition control is completed, the flow returns to 5010 to check whether the predetermined phenomenon has been detected. When the predetermined phenomenon is not detected, the projector 1 projects an image corresponding to input image information to the screen (step S030). When it is detected that the power source key has been operated in this step, the projector 1 stops projection of the image and shifts to the standby mode (step S040). The projector 1 returns to step 5010 and repeats a series of the processes described above unless operation of the power source key is detected. The predetermined phenomenon as trigger for the projection condition control involves the cases when the power source key of the projector 1 comes to ON condition, when operation of the projection condition control key is detected, when operation of the input switching key is detected, when operation of the mute key is detected, when input or break of input of image information is detected by the image information detection unit 27, when change of the display mode of the image information is detected by the image information detection unit 27, and other cases.

Figure 3:
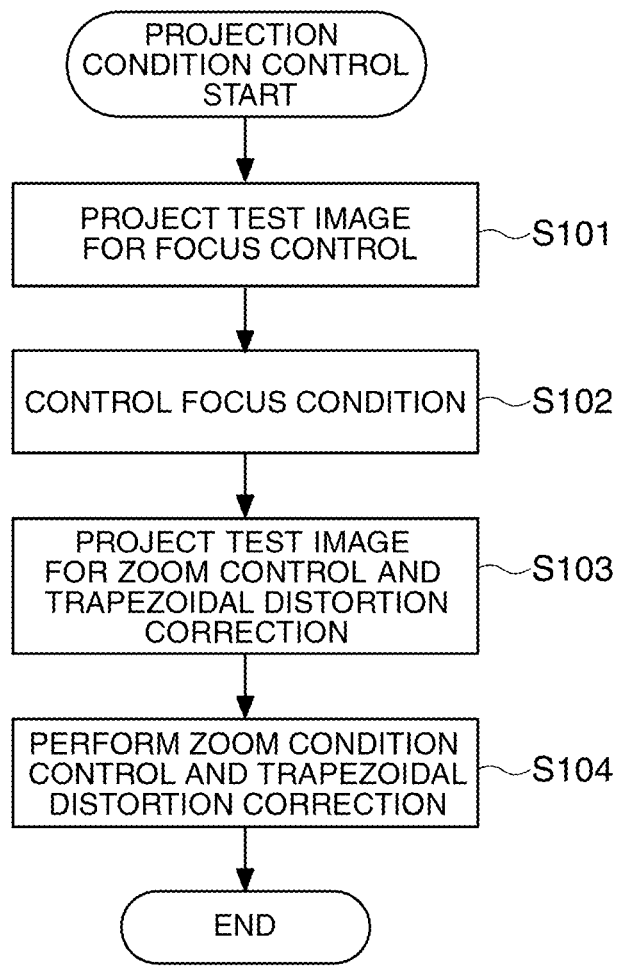
FIG. 3 is a flowchart showing control of projection condition.

FIG. 3 is a flowchart showing control of the projection condition. When receiving the request discussed above from the control unit 20, the projection condition control unit 24 operates according to the flow shown in FIG. 3. As shown in FIG. 3, the projection condition control unit 24 initially allows the image processing unit 28 to project a test image TP1A for focus control (see FIG. 4A) (step S101). The test image TP1A may be a striped image containing white areas and black areas extending in the up-down direction and alternately disposed in the left-right direction.

Then, the projection condition control unit 24 performs focus condition control based on the projected test image TP1A (step S102). More specifically, the projection condition control unit 24 allows the image pickup unit 23 to shoot the projected test image TP1A while varying the focus condition little by little by operation of the focus drive unit 15. Then, the projection condition control unit 24 analyzes frequency component contained in the picked-up image every time the focus condition is varied to detect the focus condition having the maximum frequency component or the focus condition having the maximum luminance difference (contrast) between the white areas and the black areas as appropriate focus condition (focused condition). Subsequently, the projection condition control unit 24 allows the focus drive unit 15 to operate the focus mechanism such that the detected appropriate focus condition can be reproduced, and ends the control of the focus condition.

Then, the projection condition control unit 24 allows the image processing unit 28 to project a total white image as a test image for zoom control and trapezoidal distortion correction (step S103), and performs zoom condition control and trapezoidal distortion correction (step S104).

Figure 5A:
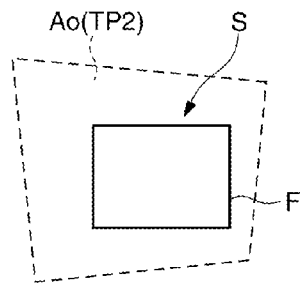
Figure 5B:
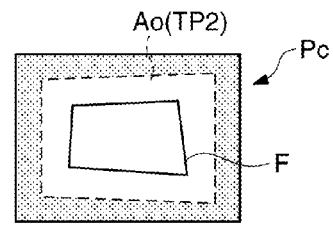
Figure 5C:
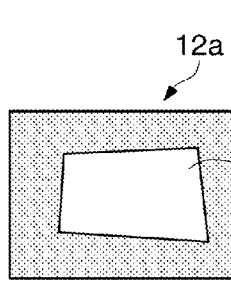
Figure 5D:
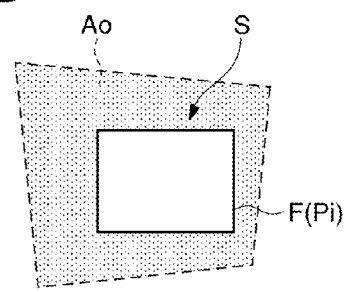
Figure 5E:
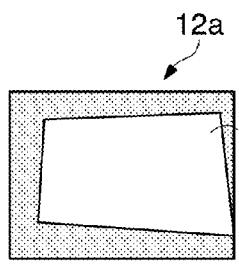
Figure 5F:
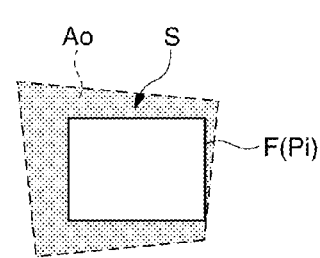

FIGS. 5A through 5F illustrate an example of zoom control and trapezoidal distortion correction. FIGS. 5A, 5D, and 5F show the screen S, FIG. 5B shows a picked-up image of the screen S, and FIGS. 5C and 5E show the pixel area 12a of the liquid crystal light valve 12.

As illustrated in FIG. 5A, the projector 1 is installed such that the optical axis of the projection lens 13 is inclined to the screen S in this example. In this case, a test image TP2 (projection image Ao) is projected on the screen S and its periphery with trapezoidal distortion corresponding to the inclination. After projecting the test image TP2, the projection condition control unit 24 allows the image pickup unit 23 to shoot an area containing the projection image Ao, and obtains a picked-up image Pc containing the projection image Ao and the edge of the screen S (screen frame F) as illustrated in FIG. 5B. The optical axis of the image pickup lens provided on the image pickup unit 23 and the optical axis of the projection lens 13 are set in the front-rear direction such that these axes extend substantially in parallel with each other. Thus, the projection image Ao is represented substantially in a rectangular shape, while the screen frame F is distorted according to the inclination of the projector 1 (optical axis of projection lens 13) with respect to the screen S on the picked-up image Pc. Strictly speaking, however, the projection image Ao is slightly distorted in trapezoidal shape since the two optical axes are not completely parallel with each other.

Then, the projection condition control unit 24 analyzes the picked-up image Pc based on the picked-up image data inputted from the image pickup unit 23 (such as contour detection) to recognize the projection image Ao and the screen frame F contained in the picked-up image Pc. Subsequently, the projection condition control unit 24 obtains the position, shape, and size of the image forming area 12e to be set within the pixel area 12a of the liquid crystal light valve 12 as correction information based on the recognized projection image Ao and the screen frame F. More specifically, as illustrated in FIG. 5C, the position, shape and size of the image forming area 12e with respect to the pixel area 12a is matched with the position, shape and size of the screen frame F with respect to the projection image Ao within the picked-up image Pc (see FIG. 5B). Then, the projection condition control unit 24 outputs the obtained correction information to the trapezoidal distortion correction unit 29 for trapezoidal correction request, and allows the image processing unit 28 to output image information corresponding to the input image information, that is, to start projection of an input image Pi. The correction information specifying the position, shape and size of the image forming area 12e is constituted by coordinates of the four corners of the image forming area 12e in predetermined coordinate system set on the pixel area 12a, for example.

The trapezoidal distortion correction unit 29 having received the above request from the projection condition control unit 24 determines the image forming area 12e corresponding to the inputted correction information within the pixel area 12a, and corrects the image information inputted from the image processing unit 28 such that the input image Pi can be formed on the image forming area 12e. Also, the trapezoidal distortion correction unit 29 sets the values of the pixels 12p positioned outside the image forming area 12e at the black pixel values, i.e., the pixel values having the minimum light transmissivity. As a result, the trapezoidal distortion of the input image Pi projected from the image projection unit 10 is cancelled, and the input image Pi in rectangular shape is displayed within the screen frame F as illustrated in FIG. 5D.

When the image forming area 12e is extremely small for the pixel area 12a, a number of pixels 12p not forming the input image Pi exist. In this case, the image quality of the input image Pi lowers. Thus, when the image forming area 12e is considerably small for the pixel area 12a, the projection condition control unit 24 expands the image forming area 12e on the basis of the zoom reference (center of the pixel area 12a) to such an extent that the entire area of the image forming area 12e is contained within the pixel area 12a as illustrated in FIG. 5E. Then, the projection condition control unit 24 outputs correction information corresponding to the expanded image forming area 12e to the trapezoidal distortion correction unit 29. Furthermore, the projection condition control unit 24 allows the zoom drive unit 16 to shift the zoom mechanism toward the tele-side for reduction of the size of the projection image Ao by the amount of expansion of the image forming area 12e. As a result, the trapezoidal distortion of the input image Pi projected from the image projection unit 10 is cancelled, and the input image Pi in rectangular form is displayed within the screen frame F with reduced image quality deterioration.

As explained above, the projector 1 controls projection condition immediately after image projection allowable condition is established. Thus, the user can observe the input image Pi in appropriate projection condition. Moreover, the projector 1 executes the flow described above (see FIG. 3) to control the projection condition when the user operates the projection condition control key. Thus, the user can observe the input image Pi in appropriate condition by operation of the projection condition control key even when the installation condition is changed after startup of the projector 1.

Furthermore, the projector 1 controls the projection condition at the time of switching the state of the input image Pi as well as at the time of the startup and operation of the projection condition control key. According to this embodiment, the projection condition control is performed in the cases when the input switching key or the mute key is operated by the user, when input or break of input of image information is detected by the image information detection unit 27, and when change of the display mode of image information is detected by the image information detection unit 27.

Figure 6:
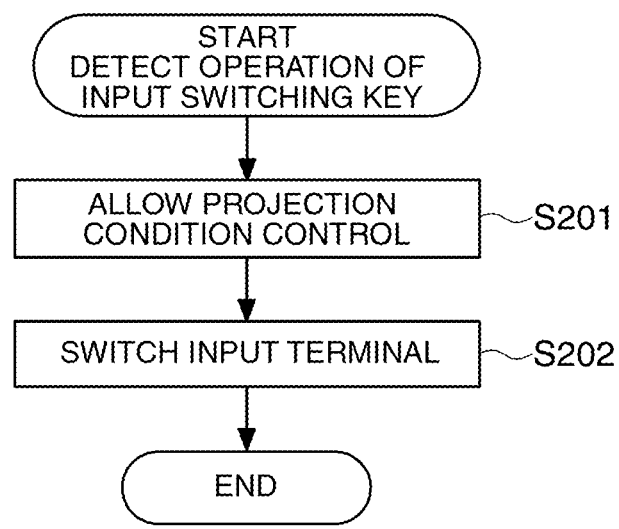
FIG. 6 is a flowchart showing operation of the projector when an input switching key is operated.

FIG. 6 is a flowchart showing the operation of the projector 1 performed when the input switching key is operated.

As shown in FIG. 6, when the operation input unit 22 detects operation of the input switching key by the user, the control unit 20 allows the projection condition control unit 24 to perform projection condition control (step S201). Then, the projection condition control unit 24 starts the projection condition control according to the flow shown in FIG. 3 in response to this request. Subsequently, the control unit 20 allows the input selection unit 26 to select the next input terminal 25a for switching the input terminal 25a (step S202), and ends the flow. After projection condition control is completed by the projection condition control unit 24, the input image Pi is projected from the next input terminal 25a.

Figure 7:
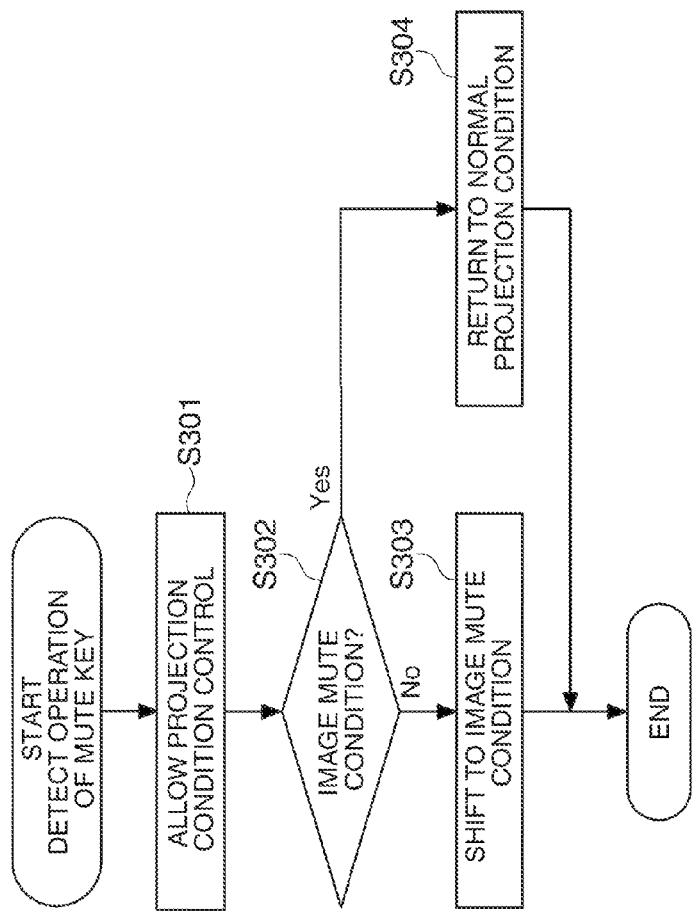
FIG. 7 is a flowchart showing operation of the projector when a mute key is operated.

FIG. 7 is a flowchart showing the operation of the projector 1 performed when the mute key is operated.

When the operation input unit 22 detects operation of the mute key by the user, the control unit 20 allows the projection condition control unit 24 to perform projection condition control as shown in FIG. 7 (step S301). The projection condition control unit 24 having received this request starts projection condition control according to the flow shown in FIG. 3. Then, the control unit 20 determines whether the current projection condition is image mute condition or normal projection condition (step S302). When it is determined that the projection condition is normal projection condition, the control unit 20 allows the image processing unit 28 to shift to image mute condition (step S303) and ends the flow. When it is determined that the current projection condition is mute condition, the control unit 20 allows the image processing unit 28 to return to normal projection condition (step S304) and ends the flow. As a result, switching between image mute condition and normal projection condition is completed after the end of the projection condition control by the projection condition control unit 24.

When image information input to the selected input terminal 25a is initiated under the condition that total black image is projected from the image projection unit 10 without input of image information to the selected input terminal 25a, the image information detection unit 27 detects the start of input and notifies the control unit 20 and the image processing unit 28 about the start (not shown in the figure). The control unit 20 allows the projection condition control unit 24 to perform projection condition control in response to this notification, and then the image processing unit 28 starts sampling of the image information. As a result, the input image Pi corresponding to the image information that the input has started is projected after completion of projection condition control.

Similarly, when input of image information to the selected input terminal 25a is stopped under the condition that the input image Pi corresponding to the image information inputted to the selected input terminal 25a has been projected from the image projection unit 10, the image information detection unit 27 detects the break of input and notifies the control unit 20 about the break. The control unit 20 allows the projection condition control unit 24 to perform projection condition control in response to this notification, and then allows the image processing unit 28 to output image information of total black image. As a result, a total black image is projected after completion of the projection condition control.

Furthermore, when the display mode of the image information inputted to the selected input terminal 25a is changed in response to operation of the external image output device by the user or for other reason (for example, when switching between interlace system and progressive system is executed, when resolution is varied, and when refresh rate is changed), the image information detection unit 27 detects the change of the display mode and notifies the control unit 20 and the image processing unit 28 about the change. The control unit 20 allows the projection condition control unit 24 to perform projection condition control in response to this notification, and then the image processing unit 28 initiates sampling corresponding to the new display mode. As a result, the input image Pi in the new display mode is projected after the end of the projection condition control.

Accordingly, the projector 1 in this embodiment detects the time when input image is switched by the input switching key, when switching between input image and total black image is executed, when the display mode is switched, that is, the time when the state of the projected image is switched based on the operation input by the user or change of image information, and performs projection condition control simultaneously with that timing.

According to the projector 1 in this embodiment, therefore, the projection condition control unit 24 controls projection condition at the time of switching the image state. Thus, the projection condition can be controlled in an appropriate manner without requiring operation input for projection condition control (operation of projection condition control key). Thus, such a user who does not know how to carry out projection condition control or who does not even know that the projector 1 has projection condition control function can observe images in adequate projection condition. Moreover, the test images TP1A and TP2 for controlling the projection condition are projected at the time of switching the image state. Thus, the user does not feel considerably uncomfortable when the test images TP1A and TP2 are projected.

In this embodiment, the control unit 20 and the input selection unit 26 used when switching the input terminal 25a in response to operation of the input switching key, the control unit 20 and the image processing unit 28 used when switching between normal projection condition and image mute condition in response to operation of the mute key, the control unit 20 and the image processing unit 28 used when switching between input image and total black image based on presence or absence of image information input, and the image processing unit 28 used when performing process associated with change of image information display mode correspond to an image switching unit.

MODIFIED EXAMPLE

This embodiment may be modified in the following manners.

In this embodiment, focus control, zoom control, and trapezoidal distortion correction are performed as projection condition control (correction). However, all the controls described herein need not be executed but only one of these may be conducted. The control method for the controls may be any method as long as a test image for control is projected. Also, projection control other than the condition controls in this embodiment (such as tone control and light source luminance control) may be carried out as long as a test image for control is projected. Furthermore, control using projection of test image and control not using projection of test image may be combined for projection condition control.

In this embodiment, projection condition control is performed at the time when the input switching key is operated by the user, when the mute key is operated by the user, when input of image information or break of input of image information is detected by the image information detection unit 27, and when switching of image information display mode is detected by the image information detection unit 27. However, projection condition control need not be executed in all of these cases but may be carried out only in one of the cases. The time when projection condition control is performed is not limited to the above cases but may be conducted in other cases as long as image state is switched.

In this embodiment, projection condition control is performed both at the time when normal projection condition is switched to image mute condition and when image mute condition is switched to normal projection condition. However, projection condition control may be executed only on one of these occasions. In this case, it is preferable that projection condition control is carried out when the user desires to start observation of images, that is, when projection of input image is restarted after switching from image mute condition to normal projection condition. In this embodiment, projection condition is controlled both at the time when image information input to the selected input terminal 25a is started and when image information input to the selected input terminal 25a is stopped. However, projection condition control may be performed only on either of these occasions. In this case, it is similarly preferable that projection condition is controlled when the user desires to start observation of images, that is, when input image projection is started after initiation of image information input to the selected input terminal 25a.

In this embodiment, focus control is performed by using the test image TP1A having stripe patterns, and zoom control and trapezoidal distortion correction are performed by using the test image TP2 as total white image. However, the test images are not limited to those but may be other various types of test image. For example, JP-A-2000-28901 shows a method using a test image containing cross mark for focus control. JP-A-2006-60447 shows a method using three test images of total white image, checkered image, and total black image for zoom control and trapezoidal distortion correction.

For switching the input terminal 25a by the input switching key in this embodiment, the input terminal 25a may be switched to the desired input terminal 25a either by repeatedly operating one input switching key or by operating an input switching key corresponding to the desired input terminal 25a as one of plural input switching keys provided on the operation input unit 22 for the plural input terminals 25a in one-to-one correspondence. Alternatively, a structure which can select (switch) only the input terminal 25a to which image information has been inputted may be employed.

In this embodiment, the projector 1 performs projection condition control when detecting press of the power source key in standby mode. However, whether the projection condition control is executed or not may be determined according to operating action for the power source key. More specifically, for shifting from standby mode to normal operation mode of the projector 1, such a structure may be employed which performs projection condition control when the power source key is continuously pressed for a predetermined time or longer, and does not perform when the power source key is pressed for a period shorter than the predetermined time. By this control, whether projection condition control is conducted or not can be notified by one action when the projector 1 is brought into projection allowable condition by press of the power source key. The operation method of the power source key for this purpose is not limited to the period for continuous pressing of the key. For example, such a structure may be adopted which performs projection condition control at the time of double click of the power source key and does not perform projection condition control at the time of one click.

Figure 4C:
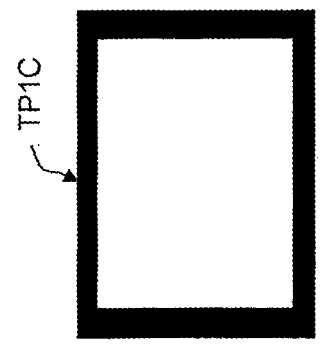
FIGS. 4A, 4B and 4C illustrate a test image for focus control.
Figure 4B:
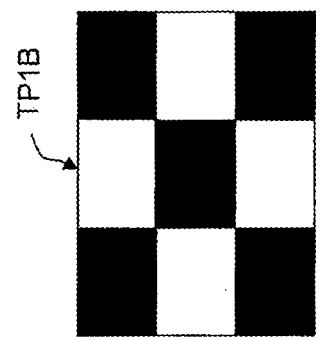
Figure 4A:
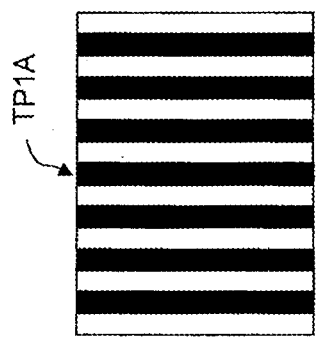

In this embodiment, the invention is explained by using the test image TP1A having stripe patterns represented in FIG. 4A. However, the invention is not limited to this embodiment. FIG. 4B explains a possible example of the test pattern TP1B which constructed by a checkered pattern. FIG. 4C is another example of the test pattern TP1C. In this example, the test pattern TP1C has a black fringe around the white rectangle. The black fringe can be nesting more than twice. FIGS. 4B and 4C have similar characteristics of FIG. 4A. That is, those test patterns illustrated here are including straight lines directed to the up-down direction or the vertical direction. Since the straight lines divide the imaged test image into the white areas and the black areas, the projection condition control unit 24 can easily detect the edges and control the focus drive unit 15 to adjust the projection lens 13 in the focal position. In the test patterns stated above, the white areas and the black areas are interchangeable.

In this embodiment, the three-plate-type projector 1 including the three liquid crystal light valves 12R, 12G, and 12B as light modulation devices has been explained. However, one liquid crystal light valve containing sub pixel transmitting R light, G light, and B light in each pixel may be employed for forming images.

According to this embodiment, the transmission-type liquid crystal light valves 12 are used as light modulation devices. However, reflection-type light modulation devices such as reflection-type liquid crystal light valves may be used. Also, micromirror array device capable of modulating light emitted from a light source by controlling emission direction of entering light for each micromirror as pixel may be employed, for example.

According to this embodiment, the light source 11 is constituted by the discharge-type light source lamp 11a. However, solid light source such as LED (light emitting diode) light source, and other types of light source may be used.

What is claimed is:

1. A projector comprising:
   a plurality of image information input terminals to which image information is inputted, each of the plurality of information input terminals being configured to receive image information from a separate external device;
   an image projection unit which projects an image corresponding to image information received by a selected one of the plurality of image information input terminals;
   an image pickup unit which shoots the image projected from the image projection unit;
   an operation input unit which receives operation input;
   an image switching unit which switches the image projected from the image projection unit by switching which one of the plural image information input terminals is selected based on the operation input received by the operation input unit; and
   a projection condition control unit which allows the image projection unit to project a predetermined test image at the time when the image switching unit switches which one of the plural image information input terminals is selected, and allows the image pickup unit to shoot the projected test image to control projection condition of the image based on the picked-up image result.

2. The projector according to claim 1, wherein the projection condition control unit controls the projection condition at the time when the image switching unit selects the one of the plural image information input terminals.

3. The projector according to claim 1
   wherein
   the image switching unit switches between normal projection condition for projecting the image from the image projection unit and image mute condition for temporarily stopping projection of the image based on the operation input received by the operation input unit, and
   the projection condition control unit controls the projection condition at the time when the image switching unit switches between the normal projection condition and the image mute condition.

4. The projector according to claim 1,
   wherein
   the image switching unit switches state of the image based on change of the image information inputted to one of the plurality of image information input terminals, and
   the projection condition control unit controls the projection condition at the time when the image switching unit switches state of the image.

5. The projector according to claim 1, wherein the predetermined test image is divided into bright areas and dark areas.

6. The projector according to claim 5, wherein the bright areas are white and the dark areas are black.

7. The projector according to claim 5, wherein the predetermined test image is a striped image.

8. The projector according to claim 5, wherein the predetermined test image is a checkered image.

9. The projector according to claim 5, wherein the predetermined test image is a white rectangle with a black fringe.

10. A control method of a projector which has an image pickup unit and a plurality of image information input terminals to which image information is inputted, each of the plurality of information input terminals being configured to receive image information from a separate external device, the control method comprising:
    projecting an image corresponding to image information received by a selected one of the plurality of image information input terminals;
    shooting the projected image;
    receiving operation input;
    switching the image projected from the image projection unit by switching which one of the plural image information input terminals is selected based on the received operation input; and
    allowing a predetermined test image to be projected at the time of switching which one of the plural image information input terminals is selected, and allowing the projected test image to be shot to control projection condition of the image based on the picked-up image result.

11. The control method of the projector according to claim 10, further comprising:
    providing an operation input unit which receives the operation input; and
    controlling the projection condition at the time when the one of the plural image information input terminals is selected.

12. The control method of the projector according to claim 10, further comprising:
    providing an operation input unit which receives the operation input;
    switching between normal projection condition for projecting the image and image mute condition for temporarily stopping projection of the image based on the operation input, and
    controlling the projection condition at the time when switching between the normal projection condition and the image mute condition is executed.

13. The control method of the projector according to claim 10, further comprising:

switching state of the image based on change of the image information inputted to one of the plurality of image information input terminals; and controlling the projection condition at the time when state of the image is switched.

* * * * *